United States Patent

Miyazaki (10) Patent No.: US 6,978,055 B2
(45) Date of Patent: Dec. 20, 2005

(54) OPTICAL MODULATOR

(75) Inventor: Yasunori Miyazaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 268 days.

(21) Appl. No.: 10/234,463

(22) Filed: Sep. 5, 2002

(65) Prior Publication Data

US 2003/0164999 A1 Sep. 4, 2003

(30) Foreign Application Priority Data

Mar. 1, 2002 (JP) .................... 2002-056077

(51) Int. Cl.[7] ............................. G02F 1/035
(52) U.S. Cl. ................ 385/2; 359/245; 359/246; 359/247
(58) Field of Search .................. 385/1–3; 359/248; 257/14

(56) References Cited

U.S. PATENT DOCUMENTS

| | | | | |
|---|---|---|---|---|
| 5,377,214 A | * | 12/1994 | Ahn | 372/45 |
| 5,621,564 A | * | 4/1997 | Kageyama et al. | 359/248 |
| 6,188,808 B1 | * | 2/2001 | Zhou et al. | 385/3 |
| 6,275,321 B1 | | 8/2001 | Greene et al. | |
| 6,382,800 B2 | * | 5/2002 | Sato | 257/103 |
| 6,580,099 B2 | * | 6/2003 | Nakamura et al. | 257/103 |
| 6,617,618 B2 | * | 9/2003 | Sato | 257/103 |

FOREIGN PATENT DOCUMENTS

| | | |
|---|---|---|
| JP | 01-204019 | 8/1989 |
| JP | 11-142799 | 5/1999 |
| JP | 11-412799 | 5/1999 |

OTHER PUBLICATIONS

S. M. Sze et al., "Physics of Semiconductor Devices". John Wiley & Sons, Inc., 1981, pp. 725.

* cited by examiner

Primary Examiner—John D. Lee
Assistant Examiner—Jennifer Doan
(74) Attorney, Agent, or Firm—Leydig, Voit & Mayer, Ltd.

(57) ABSTRACT

An optical modulator with lowered chirping without deterioration of extinction characteristic. An intermediate layer is interposed between a well layer and an n-side barrier layer and tensile strain is produced in the well layer. A relationship Ew<Em<Eb is established between a band gap energy Eb (eV) of the barrier layer, the band gap energy Ew (eV) of the well layer, and the band gap energy Em (eV) of the intermediate layer. Another type of tensile strain quantum well structure having four kinds of layers may be employed by adding another layer to the tensile strain quantum well structure having three layers. The band gap energy of an additional layer is between the band gap energies of the well layer and the intermediate layer or between the band gap energies of the intermediate layer and the barrier layer.

6 Claims, 10 Drawing Sheets

First Embodiment

Typical 10 Gbps Modulation Signal Waveform

FIG. 9B

Typical 40 Gbps Modulation Signal Waveform

OPTICAL MODULATOR

BACKGROUND OF THE INVENTION

1. Field of the Invention

The present invention relates to an optical modulator etc. having a multiple quantum well optical absorption layer between a p-type semiconductor and an n-type semiconductor.

2. Description of Related Art

The electroabsorption optical modulator (EA modulator) is an optical modulator that utilizes the electroabsorption effect that the optical absorption coefficient (hereinafter abbreviated as "absorption coefficient") of a substance varies depending on the electric field applied to it. More specifically, the EA modulator modulates light by inducing an absorption coefficient variation in a semiconductor absorption waveguide layer by applying an electric field to it. The EA modulator is generally classified into a type using an absorption waveguide layer having a quantum well structure and a type using a bulk semiconductor layer rather than a waveguide layer.

Figure 8A:
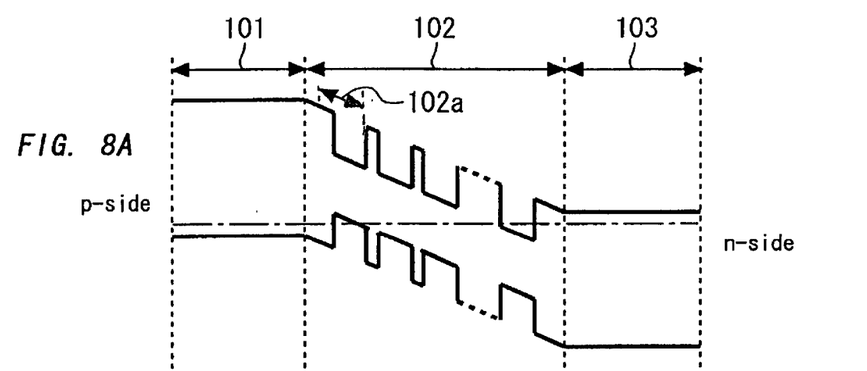
FIGS. 8A and 8B are energy band diagrams of a conventional EA modulator using an absorption waveguide layer having a quantum well structure.
Figure 8B:
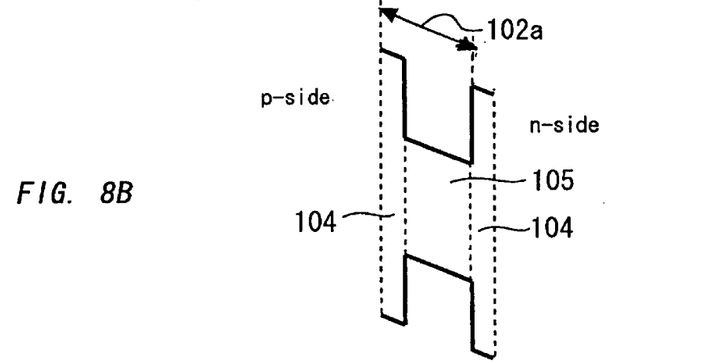
Figure 8C:
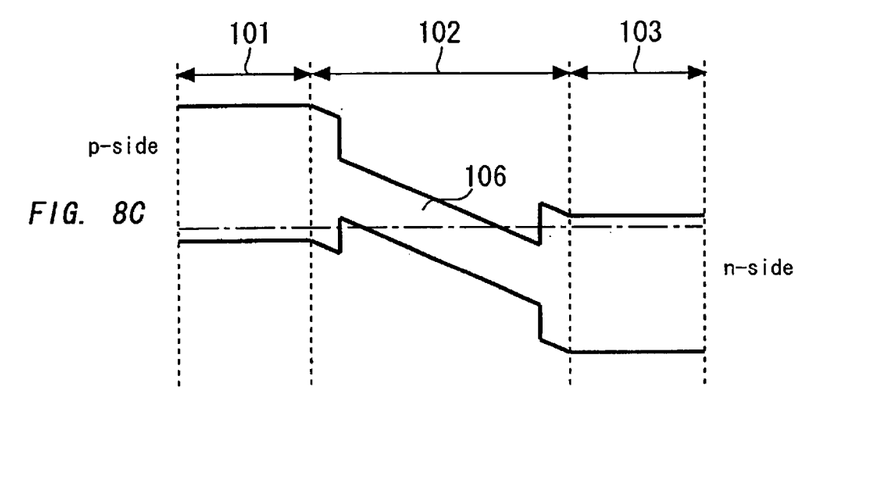
FIG. 8C is an energy band diagram of a conventional EA modulator using a bulk semiconductor layer.

FIGS. 8A and 8B are energy band diagrams of a conventional EA modulator using an absorption waveguide layer having a quantum well structure, and FIG. 8C is an energy band diagram of a conventional EA modulator using a bulk semiconductor layer. In FIGS. 8A to 8C, reference symbol 101 denotes a p-type semiconductor; 102, a multiple quantum well structure; 102a, a one-period quantum well structure within the multiple quantum well 102; 103, an n-type semiconductor; 104, a p-type-semiconductor-side (p-side) barrier layer or an n-type-semiconductor-side (n-side) barrier layer; 105, a single quantum well; and 106, a bulk semiconductor layer.

Conventionally, in optical modulators for modulation systems having modulation rates (bit rates) of 2.5 Gbps and 10 Gbps, measures have been taken to produce good light waveforms with a low degree of chirping by optimizing the absorption layer structure. The chirping (or chirp) herein means a phenomenon that the light frequency varies continuously as a function of time. However, with an increase in the bit rate that is required for optical modulators, producing good light waveforms with a low degree of chirping is now becoming difficult. In particular, there is a problem that no effective measures for reducing the degree, of chirping haven been proposed yet for optical modulators for modulation systems having a bit rate of 40 Gbps.

Figure 9A:
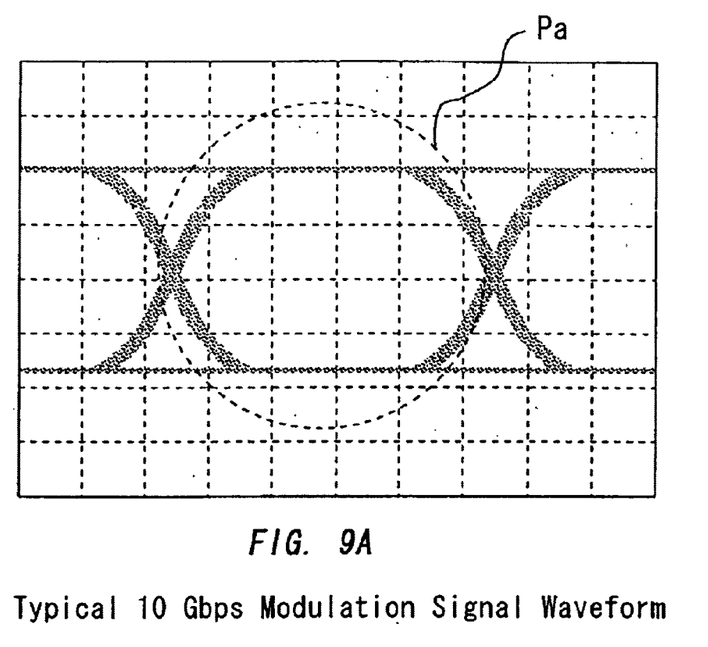
FIGS. 9A and 9B show typical modulation signal waveforms of driver circuits for driving a conventional optical modulator.
Figure 9B:
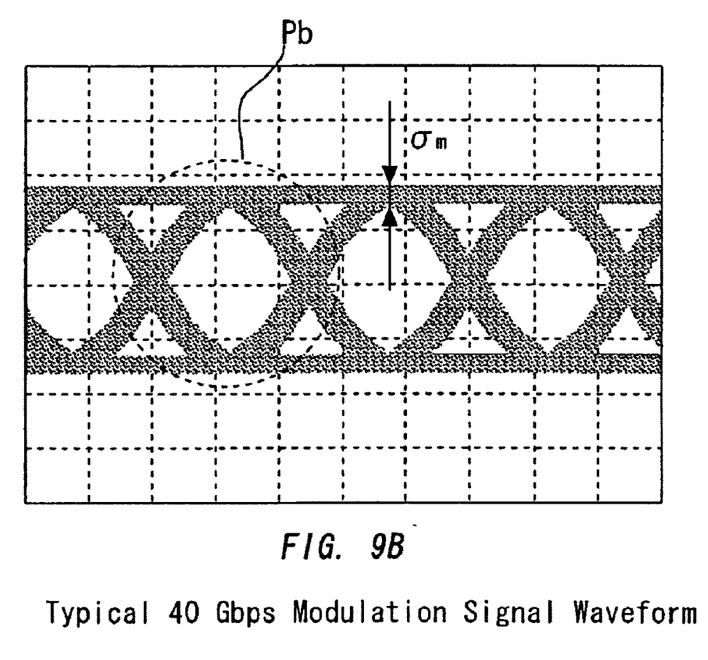

A description will now be given of how reducing the degree of chirping becomes more difficult as the bit rate that is required for optical modulators increases. FIGS. 9A and 9B show typical modulation signal waveforms of driver circuits for driving a conventional optical modulator. More specifically, FIGS. 9A and 9B show modulation signal waveforms in the case where the bit rate is equal to 10 Gbps and 40 Gbps, respectively. As shown in FIG. 9A, where the bit rate is equal to 10 Gbps, the modulation signal waveform is close to a rectangular one in which the 0level and the 1-level can easily be discriminated from each other as seen from part Pa that is enclosed by a broken line. On the other hand, as shown in FIG. 9B, where the bit rate is equal to 40 Gbps, even with a driver circuit that is optimized for this modulation rate, a waveform that is closer to a rhombic one than to a rectangular one can only be obtained as seen from part Pb that is enclosed by a broken line. Further, as shown in FIG. 9B, the spread $\sigma_m$ of the 1-level line is increased, which is a factor of increasing an error ratio of fiber-transmitted codes in optical communication systems. As described above, in conventional optical modulators, the modulation signal waveform deteriorates as the bit rate increases, resulting in a problem that it is difficult to generate equivalent optical signal waveforms irrespective of the bit rate.

To solve the above problem, the extinction characteristic of an optical modulator is required to have a small gradient near the 1-level. The extinction characteristic herein means an optical output power vs. application voltage (V) characteristic. A description will be made below by using extinction characteristics of conventional optical modulators shown in FIGS. 10A to 10C.

Figure 10A:
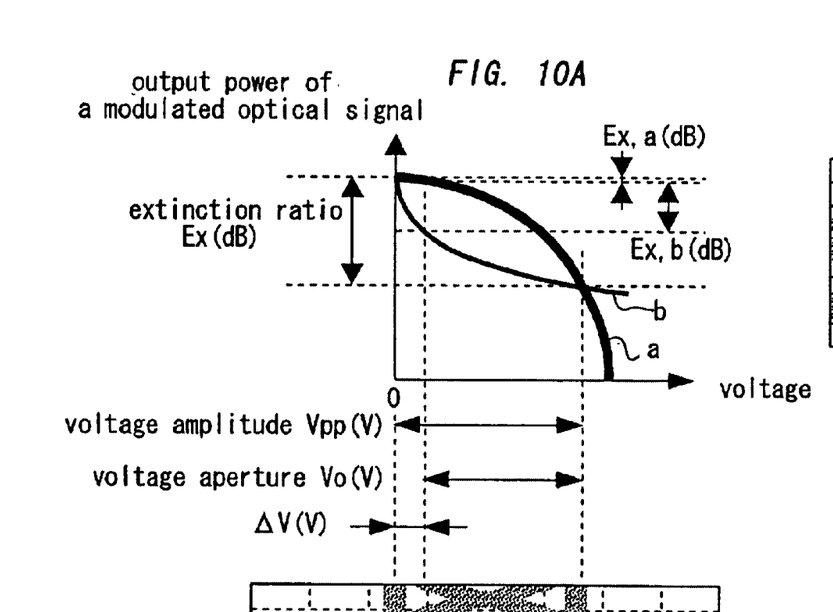
FIG. 10A shows the extinction ratio characteristics of conventional optical modulators and FIG. 10B shows a modulated optical waveform and FIG. 10C shows a modulation signal waveform.
Figure 10B:
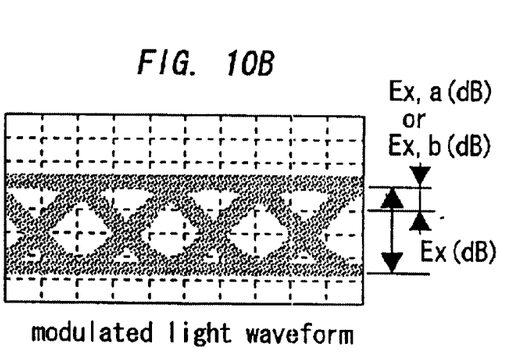
Figure 10C:
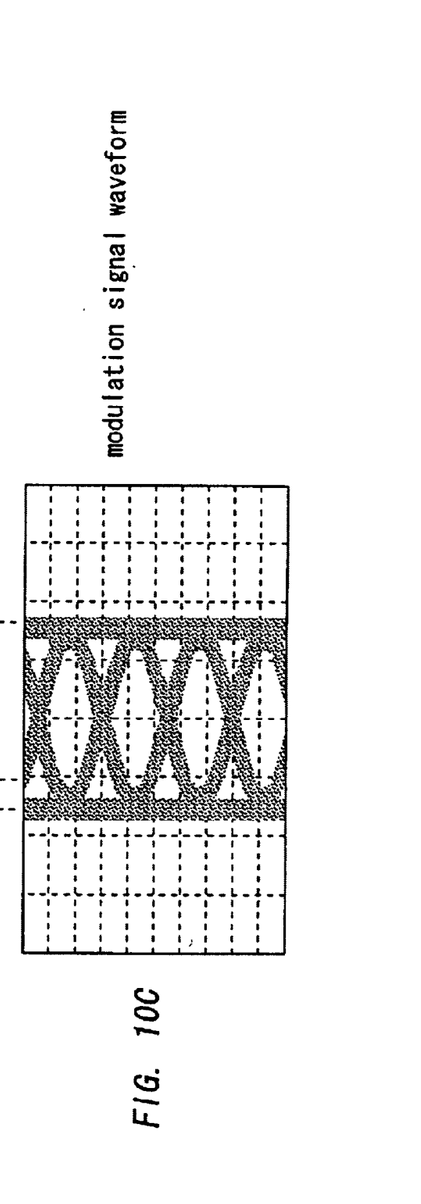

In FIG. 10A, the horizontal axis represents the application voltage (V) and the vertical axis represents the output power of a modulated optical signal. Symbol $V_{pp}$ represents a voltage amplitude (V), $V_o$ represents a voltage aperture (V), and $\Delta V$ represents a spread (V) of the application voltage. Curves a and b are extinction characteristics of different optical modulators. FIG. 10B shows a modulated optical waveform and FIG. 10C shows a modulation signal waveform. As shown in FIG. 10A, the extinction characteristic curves a and b exhibit the same extinction ratio Ex (dB) for the same voltage amplitude $V_{pp}$. The extinction ratio means a ratio of a maximum value to a minimum value that are obtained when the transmission optical intensity is varied in an optical modulator. The term "gradient near the 1-level" (of each of the extinction characteristic curves a and b) means an extinction ratio Ex (dB) for a spread of the application voltage on the 1-level side of the modulated optical signal (on the 0-V side of the application voltage in FIG. 10A). As shown in FIG. 10A, in the extinction characteristic curve a (i.e., in the optical modulator exhibiting such an extinction characteristic), the gradient near the 1-level is small, that is, an extinction ratio Ex, a (dB) for a 1-level-side spread $\Delta V$ of the modulation signal waveform is small. On the other hand, in the optical modulator that exhibits the extinction characteristic curve b (i.e., in the optical modulator exhibiting such an extinction characteristic), the gradient near the 1-level is large, that is, an extinction ratio Ex, b (dB) for the 1-level-side spread $\Delta V$ of the modulation signal waveform is large. A relationship Ex, a<Ex, b holds. In the modulated optical waveform shown in FIG. 10B, a spread of the modulated optical waveform near the 1-level corresponds to the extinction ratio Ex, a or Ex, b. Therefore, to obtain an optical modulator that provides a small spread of a modulated optical waveform near the 1-level and hence enables a good bit error ratio, an extinction characteristic curve that is like the curve a rather than the curve b should be realized. That is, an optical modulator is necessary in which the extinction ratio Ex (dB) is kept approximately the same and the gradient near the 1-level of the extinction characteristic is kept small as the bit rate is increased.

However, a general empirical rule is such that if a means for decreasing the gradient near the 1-level of the extinction characteristic without sacrificing the extinction ratio Ex (dB) is used, for example, if a means for adjusting the well width or barrier height of multiple quantum wells (MQWs) that are used in an optical absorption layer of an optical modulator is used, the degree of chirping increases necessarily. That is, there is a problem that it is difficult to lower the degree of chirping without deteriorating the extinction characteristic of an optical modulator. It is considered that this problem prevents realization of a low-chirp modulator that can be used at such a high modulation rate as 40 Gbps. As a matter of fact, no low-chirp modulators capable of operating at 40 Gbps have not been reported yet at academic meetings etc.

SUMMARY OF THE INVENTION

The present invention has been achieved to solve the above problems and an object of the invention is therefore to provide an optical modulator or the like devices capable of lowering the degree of chirping without deteriorating the extinction ratio characteristic.

According to an aspect of the present invention, there is provided an optical modulator having an optical absorption layer of multiple quantum wells between a p-type semiconductor and an n-type semiconductor, one-period structure of the multiple quantum wells includes: a barrier layer having a first band gap; a well layer that is adjacent to the barrier layer and closer to the n-type semiconductor than the barrier layer, the well layer having a second band gap that is smaller than the first band gap; and an intermediate layer that is adjacent to the well layer and closer to the n-type semiconductor than the well layer, the intermediate layer having a third band gap that is greater than the second band gap and smaller than the first band gap, wherein tensile strain is given to the well layer.

The optical modulator having the tensile-strained quantum wells with the intermediate layers can lower the degree of chirping without deteriorating the extinction ratio characteristic of the optical modulator.

The above and other objects, effects, features and advantages of the present invention will become more apparent from the following description of the embodiments thereof taken in conjunction with the accompanying drawings.

DETAILED DESCRIPTION OF THE PREFERRED EMBODIMENTS

Embodiments of the present invention will be described below with reference to the accompanying drawings. It is noted that the same reference symbols in the drawings denote the same or corresponding components.

First Embodiment

Figure 1A:
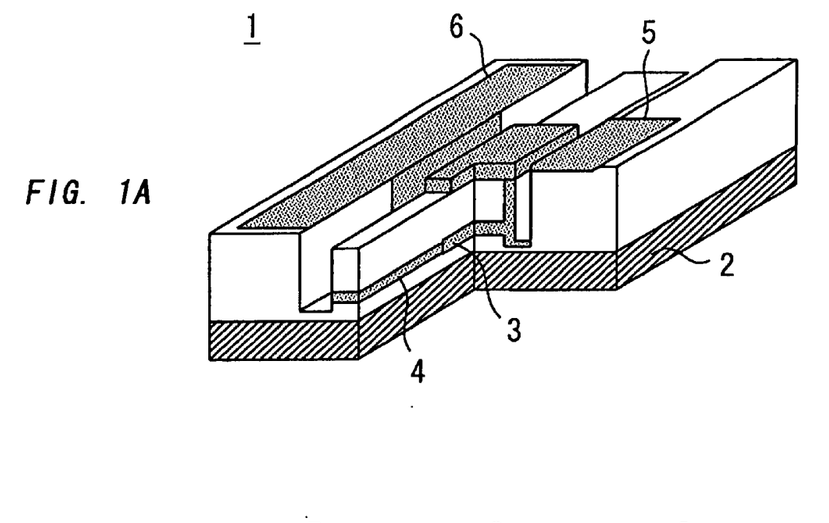
FIGS. 1A to 1C illustrate an optical modulator according to a first embodiment of the invention.
Figure 1B:
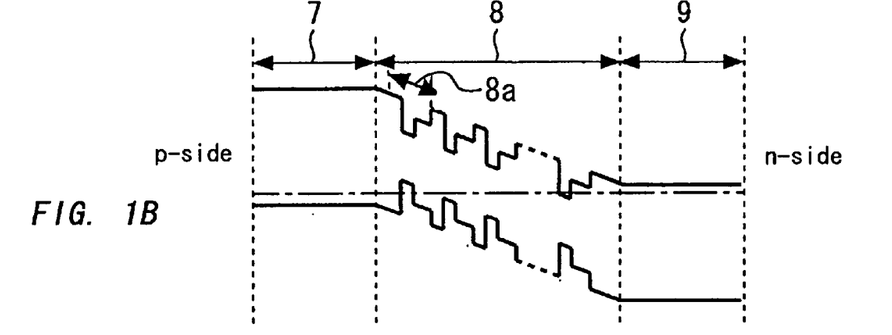
Figure 1C:
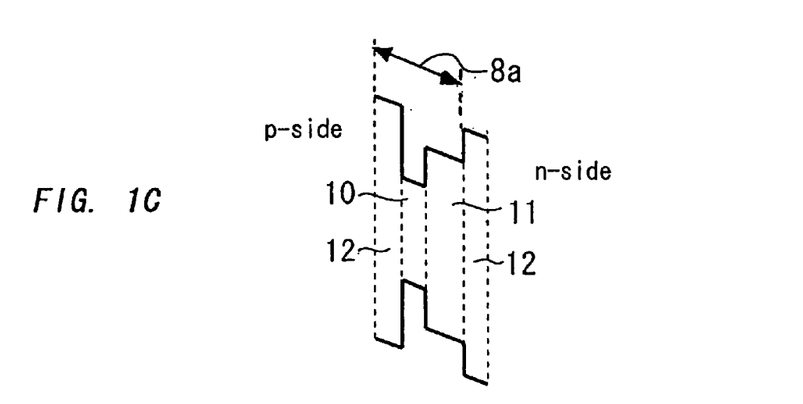

FIGS. 1A to 1C illustrate an optical modulator according to a first embodiment of the invention. FIG. 1A shows an entire optical modulator. FIG. 1B is an energy band diagram of multiple quantum wells. FIG. 1C shows a one-period structure of the multiple quantum wells. In FIG. 1A, reference numeral 1 denotes the optical modulator; 2, a semi-insulative Si—InP substrate; 3, an optical absorption layer; 4, a waveguide; 5, a p-type electrode; and 6, an n-type electrode. As shown in FIG. 1A, signal light is coupled with the absorption layer 3 via the waveguide 4. Signal light can be modulated by increasing the absorption coefficient of the absorption layer 3 by grounding the n-type electrode 6 and applying a negative voltage to the p-type electrode 5.

In FIGS. 1B and 1C, reference symbol 7 denotes a p-type cladding layer; 8, multiple quantum wells; 8a, a one-period of the multiple quantum wells; 9, an n-type cladding layer; 10, a well layer; 11, an intermediate layer; and 12, a barrier layer. The well layer 10 is given tensile strain, whereby a tensile strain quantum well structure is provided in which tensile strain is put on the crystal lattices across the plane. As shown in FIG. 1C, the intermediate layer 11 is interposed between the well layer 10 and the n-side barrier layer 12. The band gap (first band gap) Eb (eV) of the barrier layers 12, the band gap (second band gap) Ew (eV) of the well layer 10, and the band gap (third band gap) Em (eV) of the intermediate layer 11 have a relationship $$Ew < Em < Eb. \tag{1}$$

Figure 2A:
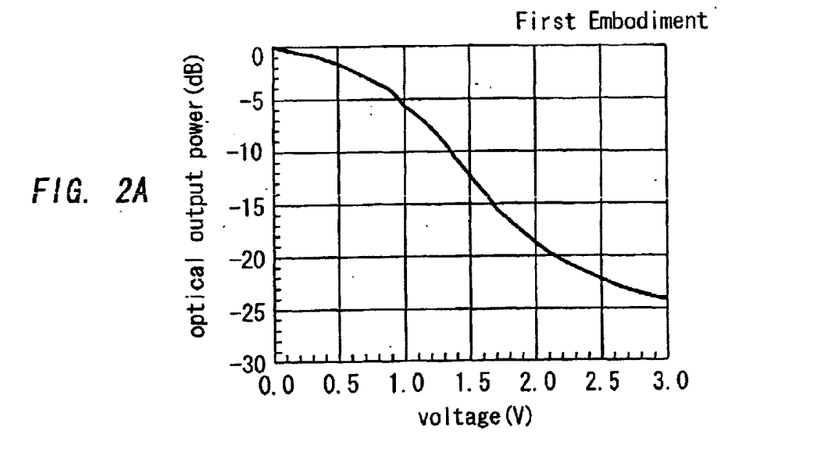
FIGS. 2A to 2C are graphs for comparing various characteristics of an optical modulator having tensile-strained quantum wells with the intermediate layers according to the first embodiment with those of an optical modulator having simple quantum wells with no intermediate layers.
Figure 2B:
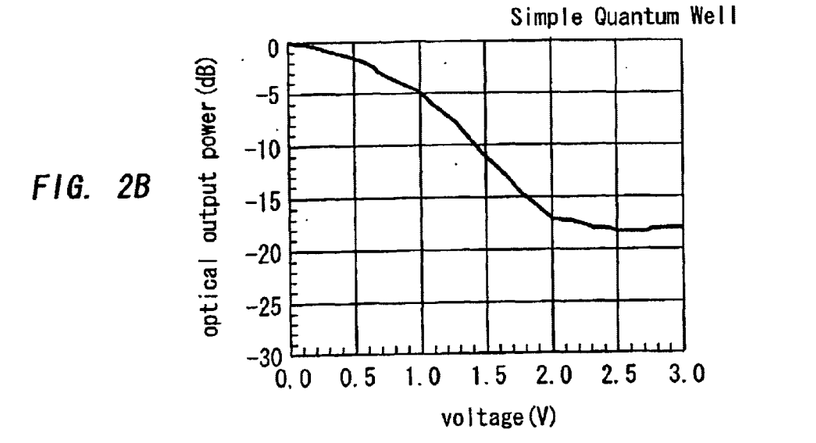
Figure 2C:
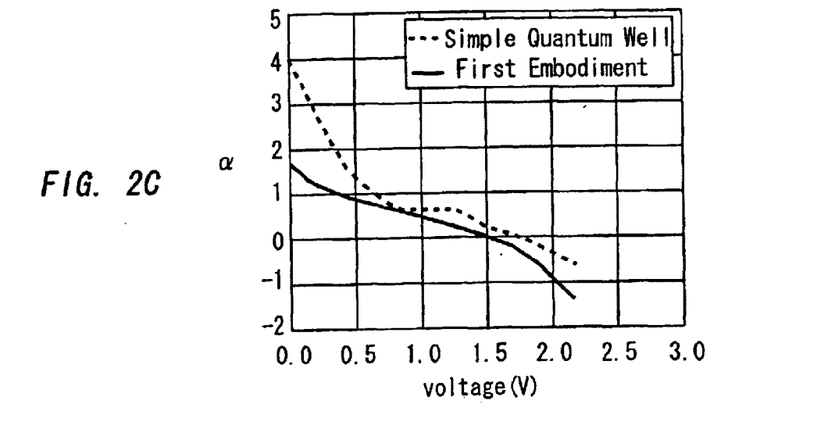

FIGS. 2A to 2C are graphs for comparing various characteristics of the optical modulator 1 having the tensile-strained quantum wells with the intermediate layers 11 according to the first embodiment with those of an optical modulator having tensile-strained simple quantum wells with no intermediate layers 11. FIG. 2A shows a measurement result of an extinction characteristic of the optical modulator 1 having the tensile-strained quantum wells with the intermediate layers 11 (the first embodiment), and FIG. 2B shows a measurement result of an extinction characteristic of the optical modulator having the tensile-strained simple quantum wells with no intermediate layers 11. In FIGS. 2A and 2B, the horizontal axis represents the voltage (V) and the vertical axis represents the optical output power (dB). Conditions are so set that the two extinction characteristics become equivalent at a voltage of about 0 V.

FIG. 2C shows measurement results of chirp characteristics (α parameter vs. voltage characteristics) of the two optical modulators. The α parameter is a linewidth enhancement factor and is a ratio of a refractive index variation to an absorption coefficient variation (or a gain variation). In FIG. 2C, the horizontal axis represents the voltage (V) and the vertical axis represents the at parameter. The solid line represents a characteristic of the optical modulator 1 having the tensile-strained quantum wells with the intermediate layers 11 according to the first embodiment, and the broken line represents a characteristic of the optical modulator having the tensile-strained simple quantum wells.

The extinction characteristic of FIG. 2A and the α parameter vs. voltage characteristic (solid line: first embodiment) of FIG. 2C were obtained for the same wavelength.

Similarly, the extinction characteristic of FIG. 2B and the α parameter vs. voltage characteristic (broken line: tensile strain simple quantum well) of FIG. 2C were obtained for the same wavelength. As seen from FIGS. 2A to 2C, the optical modulator 1 having the tensile-strained quantum wells with the intermediate layers 11 according to the first embodiment is lower in the degree of chirping than the optical modulator having the tensile-strained simple quantum wells while the two optical modulators have equivalent extinction characteristics.

Figure 3A:
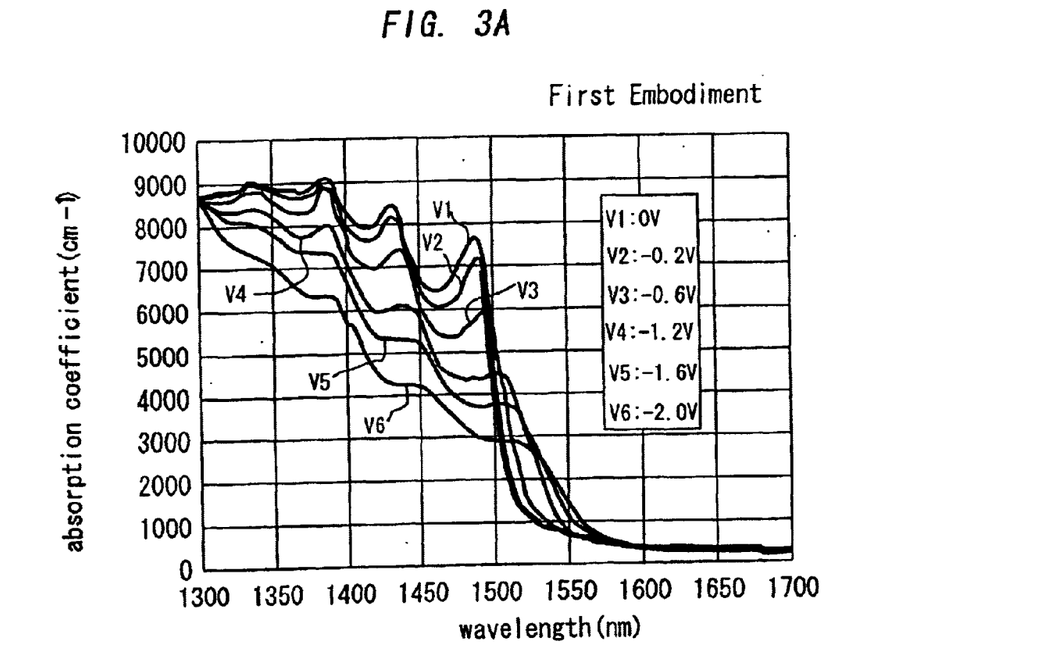
FIG. 3A shows absorption spectra of the optical modulator having the tensile-strained quantum wells with the intermediate layers according to the first embodiment.
Figure 3B:
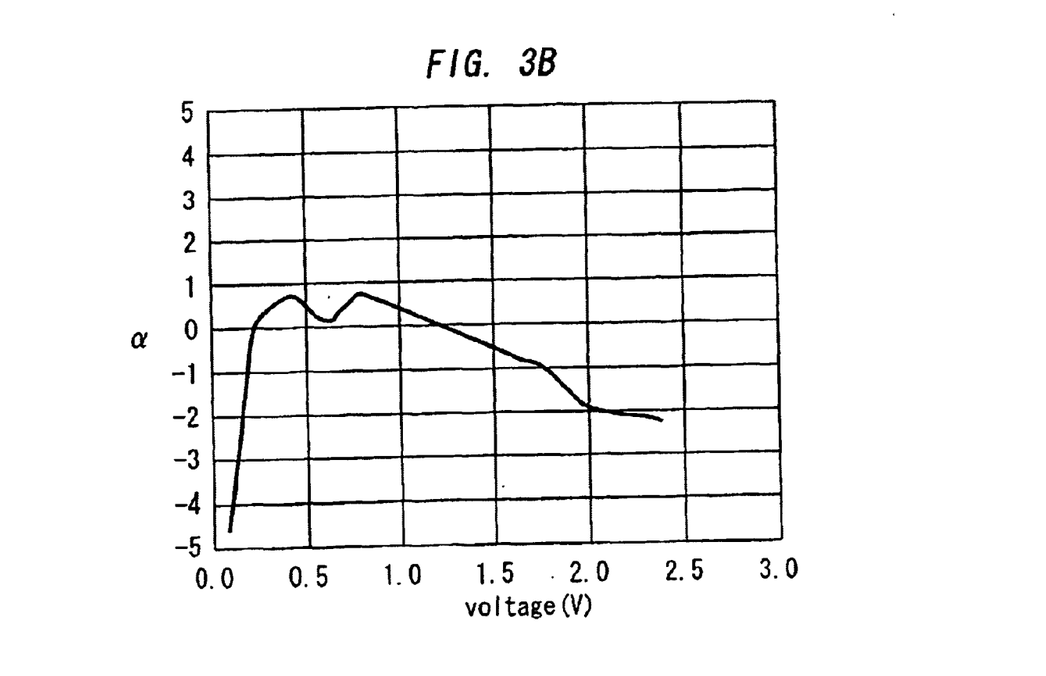
FIG. 3B shows a calculation result of the α parameter.

FIG. 3A shows absorption spectra of the optical modulator 1 having the tensile-strained quantum wells with the intermediate layers 11 according to the first embodiment, and FIG. 3B shows a calculation result of the α parameter. In FIG. 3A, the horizontal axis represents the wavelength (nm) and the vertical axis represents the absorption coefficient ($cm^{-1}$). In FIG. 3B, the horizontal axis represents the voltage (V) and the vertical axis represents the α parameter. FIG. 3A shows absorption spectra corresponding to respective application voltages V1 to V6. The application voltage V1 is equal to 0 V. The application voltages V2 to V6 are reverse bias voltages of −0.2 V, −0.6 V, −1.2 V, −1.6 V, and −2.0 V, respectively. It is seen that the peaks and the shorter-wavelength-side portion of the absorption spectrum decrease to a large extent when each of the reverse bias voltages V2 to V6 is applied. An absorption coefficient variation and a refractive index variation of an optical modulator that occur when a voltage is applied are correlated with each other according to the Kramers-Kronig relations. Where the peaks and the shorter-wavelength-side portion of the absorption spectrum decrease to a large extent as shown in FIG. 3A, the negative component of a refractive index variation can be made large. Therefore, the α parameter can be made small as shown in FIG. 3B.

Figure 4A:
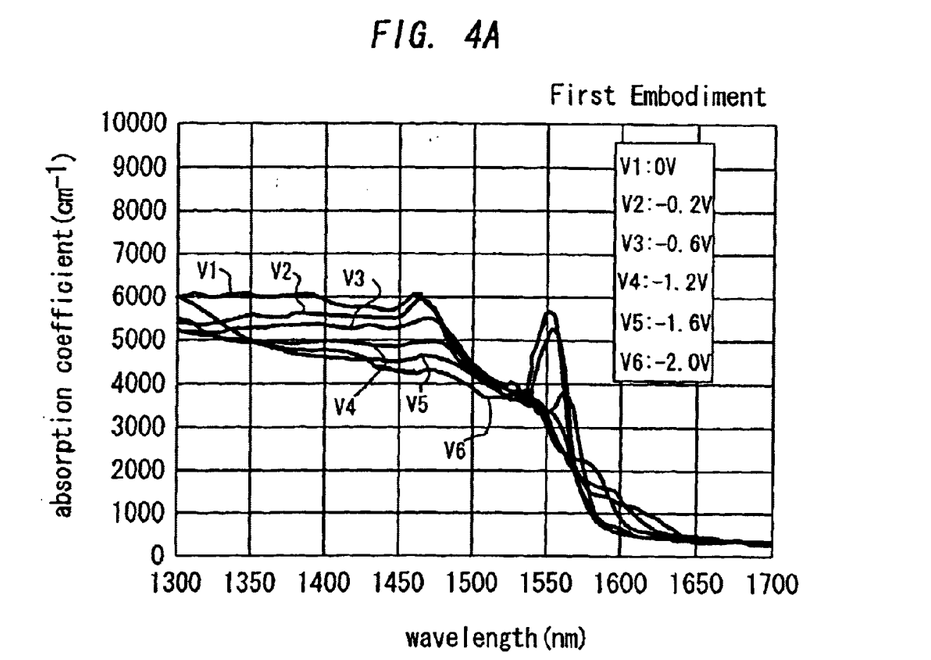
FIG. 4A shows absorption spectra of an optical modulator having simple quantum wells.
Figure 4B:
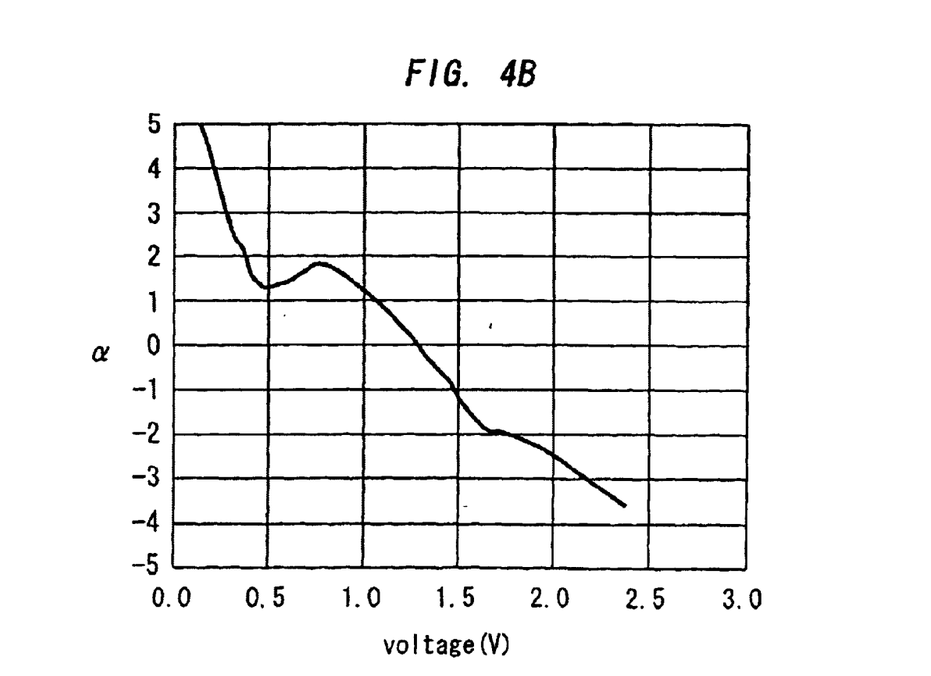
FIG. 4B shows a calculation result of the α parameter.

FIG. 4A shows absorption spectra of an optical modulator having a tensile strain simple quantum wells, and FIG. 4B shows a calculation result of the α parameter. In FIG. 4A, the horizontal axis represents the wavelength (nm) and the vertical axis represents the absorption coefficient ($cm^{-1}$). FIG. 4A shows absorption spectra corresponding to respective application voltages V1 to V6 that are the same as shown in FIG. 3A. In FIG. 4B, the horizontal axis represents the voltage (V) and the vertical axis represents the a parameter. It is seen that the absorption spectrum does not much decrease unlike the case of FIG. 3A. As a result, a large positive refractive index variation remains and hence a large positive α parameter remains as shown in FIG. 4B.

In the first embodiment, even if the well layer 10 is made of any material, the same effects can be obtained by optimizing the well width and the strain coefficient parameter. For use in modulation light sources for optical communication, InGaAsP, InGaAs, and InGaAlAs may be used as the material of the well layer 10. The measurement results and the calculation results shown above with reference to FIGS. 1A to 1C to FIGS. 4A and 4B evidence the effects that are obtained when InGaAsP is used as the material of the well layer 10.

As described above, according to the first embodiment, the relationship Ew<Em<Eb can be established between the band gap Eb (eV) of the barrier layers 12, the band gap Ew (eV) of the well layer 10, and the band gap Em (eV) of the intermediate layer 11 by interposing the intermediate layer 11 between the well layer 10 and the n-side barrier layer 12 and producing tensile strain in the well layer 10. As a result, in contrast to the conventional optical modulator having tensile strain simple quantum wells, the optical modulator having the tensile-strained quantum wells with the intermediate layers 11 according to the first embodiment can lower the degree of chirping without deteriorating the extinction characteristic of the optical modulator.

Second Embodiment

Figure 5A:
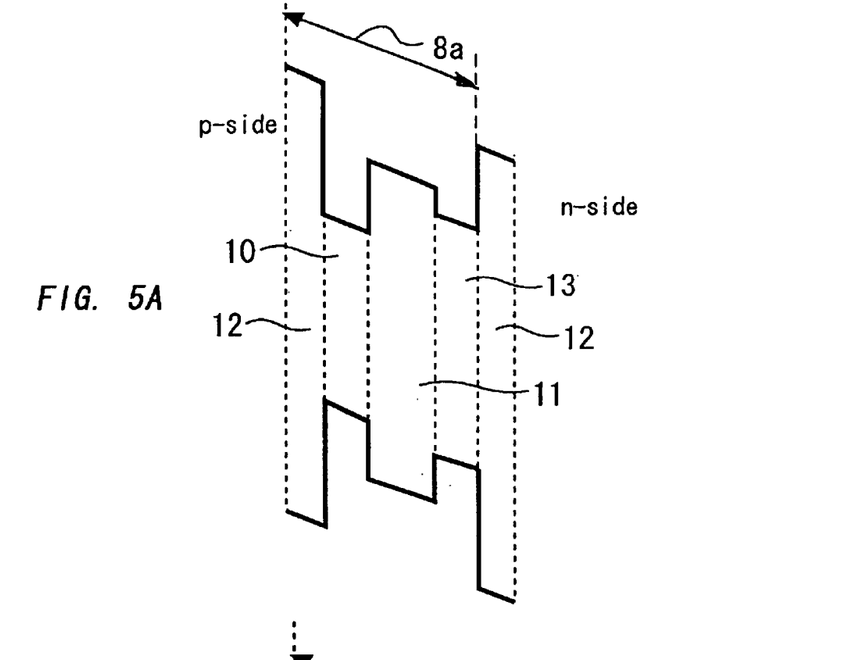
FIGS. 5A and 5B are energy band diagrams showing multiple quantum wells of an optical modulator according to a second embodiment of the invention.
Figure 5B:
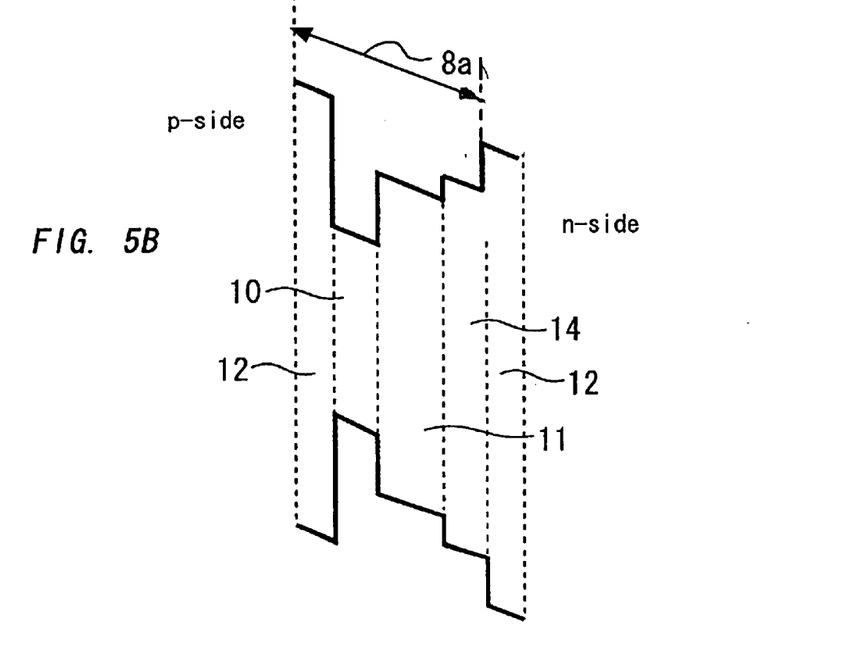

FIGS. 5A and 5B are energy band diagrams showing multiple quantum wells of an optical modulator according to a second embodiment of the invention. Elements in FIGS. 5A and 5B having the same elements in FIG. 1C are given the same reference numerals as the latter and will not be described. In FIG. 5A, reference numeral 13 denotes a layer whose band gap is between the band gaps of the well layer 10 and the intermediate layer 11. In FIG. 5B, reference numeral 14 denotes a layer whose band gap is between the band gaps of the intermediate layer 11 and the barrier layers 12.

In the above-described first embodiment, the three kinds of layers, that is, the well layer 10, the intermediate layer 11, and the barrier layers 12, are provided in each one-period of the quantum well 8a of the multiple quantum wells 8. In contract, in the second embodiment, the four kinds of layers, that is, the above three kinds of layers plus the additional layer, are provided in each one-period of the quantum well 8a. Like the first embodiment, the second embodiment can lower the degree of chirping without sacrificing other characteristics by optimizing the well layer 10 that is given tensile strain and the intermediate layer 11.

Irrespective of the number of layers included in each one-period of the quantum well 8a, the same effects as obtained by the first embodiments can be obtained as long as it has a tensile strain quantum well structure including the same well layer 10 and intermediate layer 11 as in the first embodiment.

As described above, in the second embodiment, the tensile strain quantum well structure is provided that has the four kinds of layers, that is, the well layer 10, the intermediate layer 11, and the barrier layers 12 of the first embodiment plus the additional layer. The band gap of the additional layer is between the band gaps of the well layer 10 and the intermediate layer 11 or between the band gaps of the intermediate layer 11 and the barrier layers 12. Even with this structure, like the first embodiment, the second embodiment can lower the degree of chirping without deteriorating the extinction characteristic of the optical modulator. Irrespective of the number of layers included in each one-period of the quantum well 8a, the second embodiment can lower the degree of chirping without deteriorating the extinction characteristic of the optical modulator as long as each one-period of the quantum well 8a has a tensile strain quantum well structure including the same well layer 10 and intermediate layer 11 as in the first embodiment.

Third Embodiment

Figure 6:
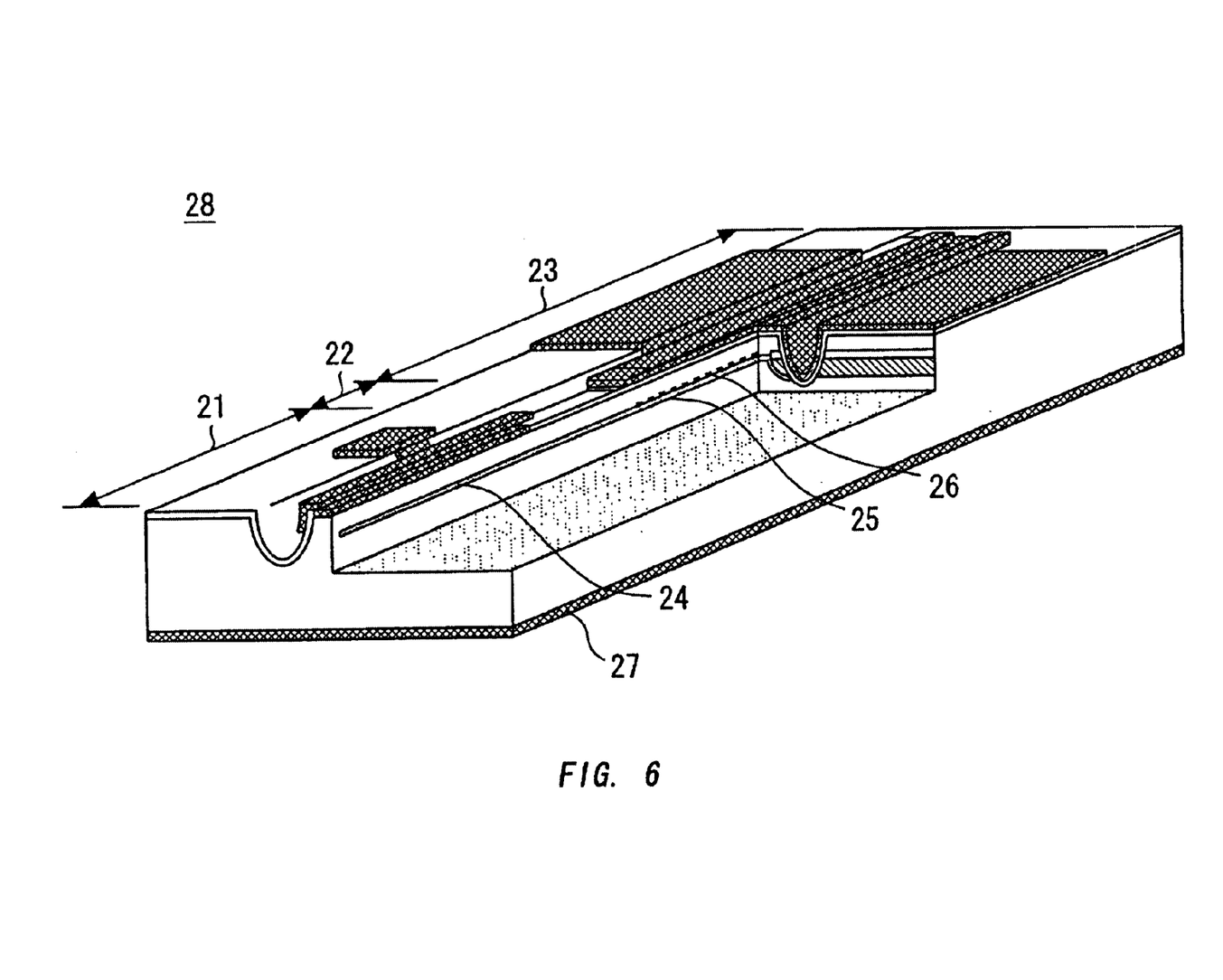
FIG. 6 shows a semiconductor laser with an optical modulator (i.e., a moduiator-integrated semiconductor laser device) according to a third embodiment of the invention.

FIG. 6 shows a semiconductor laser with an optical modulator (i.e., a modulator-integrated semiconductor laser device) according to a third embodiment of the invention. In FIG. 6 reference numeral 21 denotes the optical modulator according to the first or second embodiment; 22, an isolation region; 23, a semiconductor laser; 24, an optical modulator absorption layer; 25, a semiconductor laser active layer; 26, a diffraction grating; 27, an InP substrate; and 28, the entire semiconductor laser with an optical modulator.

In the third embodiment, the optical modulator 1 according to the first or second embodiment is integrated with the semiconductor laser 23, whereby this device is given both of the laser light generating function that is realized by current injection and the high-speed, low-chirp optical modulating function.

As described above, in the third embodiment, by integrating the optical modulator 1 according to the first or second embodiment with the semiconductor laser 23, the third embodiment can lower the degree of chirping without deteriorating the extinction characteristic of the semiconductor laser 28 with an optical modulator.

Fourth Embodiment

Figure 7:
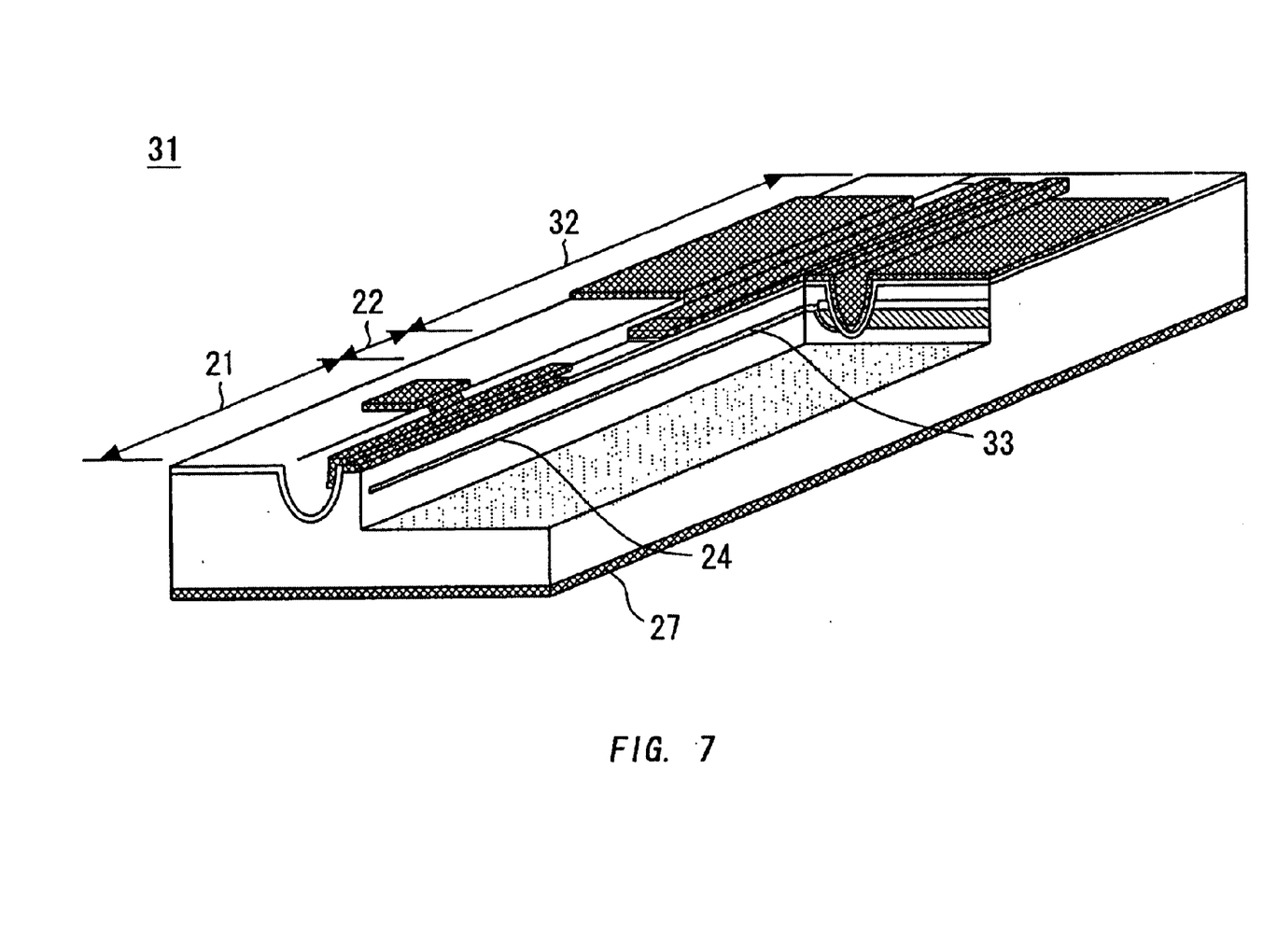
FIG. 7 shows an optical-amplifier-integrated optical modulator according to a fourth embodiment of the invention.

FIG. 7 shows an optical-amplifier-integrated optical modulator according to a fourth embodiment of the invention. Elements in FIG. 7 having the same elements in FIG. 6 are given the same reference numerals as the latter and will not be described. In FIG. 7, reference numeral 32 denotes a (semiconductor) optical amplifier; 33, an optical amplifier active layer; and 31, the entire optical-amplifier-integrated optical modulator.

In a fourth embodiment, the semiconductor optical amplifier 32 is integrated with the optical modulator 1 according to the first or second embodiment, whereby loss that is cased by light absorption in the optical modulator 21 can be compensated for by the semiconductor optical amplifier 32.

As described above, in the fourth embodiment, by integrating the semiconductor optical amplifier 32 with the optical modulator according to the first or second embodiment, the fourth embodiment can lower the degree of chirping without deteriorating the extinction ratio characteristic.

The optical modulator 1 according to the first or second embodiment, the semiconductor laser 28 with an optical modulator according to the third embodiment, or the optical-amplifier-integrated optical modulator 31 according to the fourth embodiment can be provided as an optical module device. Also in this case, the optical module device can lower the degree of chirping without deteriorating the extinction characteristic as in the same manner as in the case of the first embodiment etc.

Such an optical module device can be provided as part of an optical communication system. Also in this case, the optical communication system can lower the degree of chirping without deteriorating the extinction characteristic as in the same manner as in the case of the first embodiment etc.

As described above, according to the optical modulator etc. of the invention, the relationship Ew<Em<Eb can be established between the band gap Eb (eV) of the barrier layers 12, the band gap Ew (eV) of the well layer 10, and the band gap Em (eV) of the intermediate layer 11 by interposing the intermediate layer 11 between the well layer 10 and the n-side barrier layer 12 and producing tensile strain in the well layer 10. As a result, the invention can provide an optical modulator etc. capable of lowering the degree of chirping without deteriorating the extinction characteristic of the optical modulator.

Here, the optical modulator may further comprise one or more layers having predetermined band gaps between the intermediate layer and the barrier layer that is closer to the n-type semiconductor, wherein the predetermined band gaps are between the second band gap and the third band gap or between the third band gap and the first band gap.

In the optical modulator, the well layer may be made of InGaAsP, InGaAs, or InGaAlAs.

The present invention has been described in detail with respect to various embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

The entire disclosure of Japanese patent application no. 2002-056077 filed on Mar. 1, 2002 including specification, claims, drawings and summary are incorporated herein by reference in its entirety.

What is claimed is:

1. An optical modulator comprising:
   an optical absorption layer having multiple quantum wells; and
   a p-type semiconductor layer and an n-type semiconductor layer sandwiching the multiple quantum wells, wherein, one-period of the multiple quantum wells comprises
   a barrier layer having a first band gap energy,
   a well layer that is contiguous to said barrier layer and closer to the n-type semiconductor layer than to the barrier layer, the well layer having a second band gap energy that is smaller than the first band gap energy, and
   an intermediate layer that is contiguous to the well layer and closer to the n-type semiconductor layer than to the well layer, the intermediate layer having a third band gap energy that is larger than the second band gap energy and smaller than the first band gap energy, wherein the well layer is subjected to tensile strain.

2. The optical modulator according to claim 1, wherein the well layer is selected from the group consisting of InGaAsP, InGaAs, and InGaAlAs.

3. An optical modulator comprising:
   an optical absorption layer having multiple quantum wells; and
   a p-type semiconductor layer and an n-type semiconductor layer sandwiching the multiple quantum wells, wherein, one period of the multiple quantum wells comprises
   a barrier layer having a first band gap energy,
   a well layer that is adjacent to the barrier layer, the well layer being closer to the n-type semiconductor layer than is the barrier layer, the well layer having a second band gap energy that is smaller than the first band gap energy,
   an intermediate layer that is adjacent to the well layer, the intermediate layer being closer to the n-type semiconductor layer than is the well layer, the intermediate layer having a thir band gap energy that is larger than the second band gap energy and smaller than the first band gap energy, wherein the well layer is subjected to tensile strain, and
   at least one semiconductor layer having a predetermined band gap between the intermediate layer and the barrier layer and closer to the n-type semiconductor layer, wherein the predetermined band gap energy is between the second band gap energy and the third band gap energy or between the third band gap energy.

4. The optical modulator according to claim 3, wherein the well layer is selected from the group consisting of InGaAsP, InGaAs, and InGaAlAs.

5. An optical modulator comprising:
   an optical absorption layer having multiple quantum wells; and
   a p-type semiconductor layer and an n-type semiconductor layer sandwiching the multiple quantum wells, wherein, one period of the multiple quantum wells comprises
   a barrier layer having a first band gap energy,
   a well layer that is adjacent to the barrier layer, the well being closer to the n-type semiconductor layer than is the barrier layer, the well layer having a second band gap energy that is smaller than the first band gap energy, an intermediate layer that is adjacent to the well layer, the intermediate layer being closer to the n-type semiconductor layer than is the well layer, the intermediate layer having a third band gap energy that is larger than the second band gap energy and smaller than the first band gap energy, wherein the well layer is subjected to tensile strain, and at least one semiconductor layer having a predetermined band gap energy, adjacent the intermediate layer, and closer to the n-type semiconductor layer than is the intermediate layer, wherein the predetermined band gap energy is between the third band gap energy and the first band gap energy.

6. The optical modulator according to claim 5, wherein the well layer is selected from the group consisting of InGaAsP, InGaAs, and InGaAlAs.

* * * * *